(12) United States Patent
Baard

(10) Patent No.: US 8,489,147 B2
(45) Date of Patent: Jul. 16, 2013

(54) SIMPLIFIED ACCESS TO MESSAGING SERVICES

(75) Inventor: Henrik Baard, Vipemöllevägen (SE)

(73) Assignees: Sony Corporation, Tokyo (JP); Sony Mobile Communications AB, Lund (SE)

( * ) Notice: Subject to any disclaimer, the term of this patent is extended or adjusted under 35 U.S.C. 154(b) by 1262 days.

(21) Appl. No.: 11/533,046

(22) Filed: Sep. 19, 2006

(65) Prior Publication Data

US 2007/0237108 A1      Oct. 11, 2007

Related U.S. Application Data

(60) Provisional application No. 60/790,776, filed on Apr. 11, 2006.

(51) Int. Cl.
*H04M 1/00*      (2006.01)

(52) U.S. Cl.
USPC ............ 455/566; 455/412.1; 455/412.2; 455/419; 455/432.3; 455/555

(58) Field of Classification Search
USPC ............ 455/412.1, 412.2, 566, 419, 555, 455/557; 370/328; 709/203, 223, 206, 207, 709/225, 246
See application file for complete search history.

(56) References Cited

U.S. PATENT DOCUMENTS

| | | | |
|---|---|---|---|
| 5,671,354 A * | 9/1997 | Ito et al. | 726/3 |
| 6,684,248 B1 * | 1/2004 | Janacek et al. | 709/225 |
| 6,768,942 B1 * | 7/2004 | Chojnacki | 701/200 |
| 6,865,680 B1 * | 3/2005 | Wu et al. | 726/12 |
| 2002/0049858 A1 * | 4/2002 | Frietas et al. | 709/246 |
| 2003/0014315 A1 * | 1/2003 | Jaalinoja et al. | 705/18 |
| 2004/0132429 A1 * | 7/2004 | Gill et al. | 455/412.1 |

(Continued)

FOREIGN PATENT DOCUMENTS

| EP | 1 422 899 A1 | 5/2004 |
|---|---|---|
| JP | 2003-520361 A | 7/2003 |
| WO | WO 00/48110 | 8/2000 |

OTHER PUBLICATIONS

Wataru Koharugawa, "Use Web-mail more cleverly!", Yomiuri Pc, published by Yomiuri Shimbun, Japan, Jun. 1, 2005, vol. 10, No. 6, pp. 44-49. (Includes English Summary).

(Continued)

*Primary Examiner* — Manpreet Matharu
(74) *Attorney, Agent, or Firm* — Harrity & Harrity, LLP

(57) ABSTRACT

A method for enabling direct provision of a message handling area at a server of a messaging service provider is provided. The method includes associating, in the portable communication device, a first user input unit with a function to be used for connecting to the messaging service provider, sending a request, in dependence of a user actuating the first user input unit, to the messaging service provider to set up a message handling area for the user, receiving an identifier from the messaging service provider, which identifier identifies a message handling area created for the user, as well as login data for logging into the area, and associating a second user input unit with a function of accessing the message handling area, which when selected by the user, allows the user to directly access the message handling area.

23 Claims, 3 Drawing Sheets

U.S. PATENT DOCUMENTS

| | | |
|---|---|---|
| 2005/0164693 A1 | 7/2005 | Yach et al. |
| 2005/0249146 A1* | 11/2005 | Pinault et al. ................. 370/328 |
| 2006/0030315 A1 | 2/2006 | Smith et al. |
| 2006/0140405 A1* | 6/2006 | Thommana et al. .......... 380/201 |

OTHER PUBLICATIONS

International Search Report and Written Opinion dated Apr. 23, 2007.

* cited by examiner

SIMPLIFIED ACCESS TO MESSAGING SERVICES

RELATED APPLICATIONS

This application claims priority under 35 U.S.C. §119 based on U.S. Provisional Application Ser. No. 60/790,776, filed Apr. 11, 2006, the disclosure of which is incorporated herein by reference.

FIELD OF THE INVENTION

The present invention relates to the provision of messaging accounts for a user at a messaging service provider. More particularly the present invention relates to a method, portable communication device and computer program products for enabling direct provision of a message handling area at a server of a messaging service provider.

BACKGROUND OF THE INVENTION

Portable communication devices, such as cellular phones, nowadays include more and more functionality. One such functionality is the ability to browse a network like, for instance the Internet which is normally provided through a so-called web browser.

Many service providers on the Internet provide messaging services. Here, a user may open up a messaging account, typically an e-mail account, at a server of the service provider and with that account an e-mail box is provided. This type of service allows a user to log onto the server and from that server access his mailbox and also send e-mails to other people.

It is known to let a user of the portable communication device to set up and access e-mail accounts via such a web browser.

However, when doing this, there are a number of burdensome steps and actions that have to be performed by the user in order to set up an account and to access a mailbox associated with the account.

It would, therefore, be advantageous if the opening of an account and the use of services in relation to that account could be simplified for the user, where typically a user area is reserved for the user on a server of the messaging service provider for such services.

SUMMARY OF THE INVENTION

According to a first aspect of the invention, this is achieved by a method for enabling direct provision of a message handling area at a server of a messaging service provider. The method includes associating, in the portable communication device, a first user input unit with a function to be used for connecting to the messaging service provider, sending a request, in dependence of a user actuating the first user input unit, to the messaging service provider to set up a message handling area for the user, receiving an identifier from the messaging service provider, which identifier identifies a message handling area created for the user, as well as login data for logging into the area, and associating a second user input unit with a function of accessing the message handling area, which when selected by the user, allows the user to directly access the message handling area.

A second aspect of the invention includes the features of the first aspect, where the identifier that identifies a message handling area also identifies a server where the message handling area is provided.

A third aspect of the invention includes the features of the first aspect, where the associating a function of accessing the message handling area includes replacing the association to the function for connecting to the service provider with the association to the function of accessing the message handling area.

A fourth aspect of the invention includes the features of the first aspect and further includes directly accessing the message handling area in dependence of the user actuating the user input unit that is associated to the function of accessing the message handling area.

A fifth aspect of the invention includes the features of the first aspect and further includes automatically storing the received login data and automatically using the login data.

A sixth aspect of the invention includes the features of the first aspect, where the sending a request includes sending an automatically generated user identifier.

A seventh aspect of the invention includes the features of the sixth aspect and further includes directly accessing the message handling area using the user identifier, in dependence of the user actuating the second user input unit that is associated with the function of accessing the message handling area.

An eighth aspect of the invention includes the features of the sixth aspect, where the user identifier is based on an identifier of the portable communication device and an identifier associated with the user.

A ninth aspect of the invention includes the features of the eighth aspect, where the user identifier is a hash of the identifier of the portable communication device and the identifier associated with the user.

A tenth aspect of the invention includes the features of the first aspect, where the function to be used for connecting and the function of accessing are provided via a network browser application provided in the portable communication device.

An eleventh aspect of the invention includes the function to be used for connecting and the function of accessing of the tenth aspect, where the functions are provided via a first local information presentation page.

According to a twelfth aspect of the invention, a portable communication device for enabling direct provision of a message handling area at a server of a messaging service provider is provided. The portable communication device includes a network browsing unit to associate a first user input unit to a first function to be used for connecting to the messaging service provider, send, in dependence of a user actuating the first user input unit, a request to the messaging service provider to set up a message handling area for the user, receive an identifier from the messaging service provider, which identifier identifies a message handling area created for the user, as well as login data for logging into the area, associate a second user input unit to a second function of accessing the message handling area, which when selected by the user, allows the user to directly access the message handling area.

A thirteenth aspect of the invention includes the features of the twelfth aspect, where the identifier that identifies a message handling area also identifies a server where the message handling area is provided.

A fourteenth aspect of the invention includes the features of the twelfth aspect, where the network browsing unit when being arranged to associate a second function of accessing the message handling area replaces the association to the first function for connecting to the service provider with the association to the second function of accessing the message handling area.

A fifteenth aspect of the invention includes the features of the twelfth aspect, where the network browsing unit is further arranged to directly access the message handling area in dependence of a user actuating the second user input unit that is associated with the second function of accessing the message handling area.

A sixteenth aspect of the invention includes the features of the twelfth aspect, where the network browsing unit is further arranged to automatically store the received login data and automatically use the login data.

A seventeenth aspect of the invention includes the features of the twelfth aspect, where the network browsing unit when being arranged to send a request is arranged to send an automatically generated user identifier.

An eighteenth aspect of the invention includes the features of the seventeenth aspect, where the network browsing unit is further arranged to directly access the message handling area automatically using the user identifier in dependence of the user actuating the second user input unit that is associated with the second function of accessing the message handling area.

A nineteenth aspect of the invention includes the features of the seventeenth aspect, where the user identifier is based on an identifier of the portable communication device and an identifier associated with the user.

A twentieth aspect of the invention includes the features of the nineteenth aspect, where the user identifier is a hash of the identifier of the portable communication device and the identifier associated with the user.

A twenty-first aspect of the invention includes the features of the twelfth aspect, where the first function and the second function are provided via a first local information presentation page provided by the network browsing unit.

A twenty-second aspect of the invention includes the features of the twelfth aspect, where the portable communication device includes a cellular phone.

A twenty-third aspect of the invention is directed towards a portable communication device for enabling direct provision of a message handling area at a server of a messaging service provider. The portable communication device includes means for associating a first user input unit to a first function to be used for connecting to the messaging service provider, means for sending a request, in dependence of a user actuating the first user input unit, to the messaging service provider to set up a message handling area for the user, means for receiving an identifier from the messaging service provider, which identifier identifies a message handling area created for the user and a server where the message handling area is provided, as well as login data for logging into the area, and means for associating a second user input unit to a second function of accessing the message handling area, which when selected by the user, allows the user to directly access the message handling area.

According to a twenty-fourth aspect of the invention, a computer program product for enabling direct provision of a messaging account at a messaging service provider is provided. The computer program product includes computer program code, to make a portable communication device perform a method when the program code is executed by the portable communication device. The method includes associating, in the portable communication device, a first user input unit with a first function to be used for connecting to the messaging service provider, sending a request, in dependence of a user actuating the first user input unit, to the messaging service provider to set up a message handling area for the user, receiving an identifier from the messaging service provider, which identifier identifies a message handling area created for the user and a server where the message handling area is provided, as well as login data for logging into the area, and associating a second user input unit with a second function of accessing the message handling area, which when selected by the user, allows the user to directly access the message handling area.

BRIEF DESCRIPTION OF THE DRAWINGS

The invention will now be described in more detail in relation to the enclosed drawings, in which.

DETAILED DESCRIPTION OF EMBODIMENTS

Figure 1:
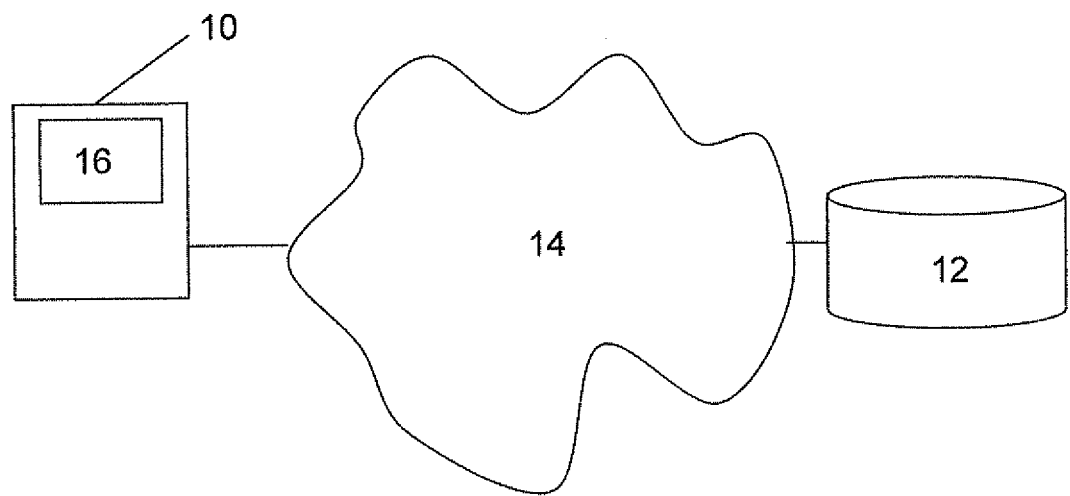
FIG. 1 shows a portable communication device communicating with a messaging service provider server via a network.

A portable communication device 10 according to an implementation of the invention is schematically shown in FIG. 1. In FIG. 1, the portable communication device 10 is connected to a server 12 of a messaging service provider via a network 14. The portable communication device 10, which is equipped with a display 16, may include, for example, a lap top computer, a palm top computer or an electronic organizer. It may also be connected to a network by communicating with a USB (Universal Serial Bus) interface of a computer. In one implementation consistent with the principles of the invention, portable communication device 10 includes a cellular phone. Portable communication device 10 includes network browsing ability and can set up messaging accounts at a messaging service provider via at least one network. Because of the possibility to provide different types of portable communication devices for use with the invention, the network 14 may be a wireless network, for instance a WLAN (Wireless Local Area Network) network, a WCDMA (Wideband Code Division Multiple Access) network, a GPRS (General Packet Radio Service) network or a fixed computer network like a LAN (Local Area Network) network. The server 12 is normally not provided in the network 14, but provided in another network, like the Internet, which the portable communication device can reach via the cellular network. However, server 12 may be provided also in the wireless network.

Figure 2:
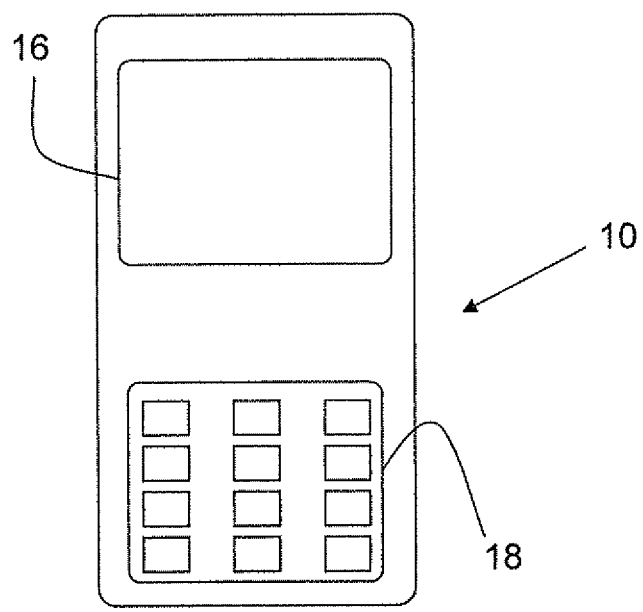
FIG. 2 shows a front view of the portable communication device in the form of a cellular phone.

FIG. 2 shows an exemplary front view of the portable communication device 10, in the form of a cellular phone. The phone 10 is provided with the display 16 and a keypad 18.

Figure 3:
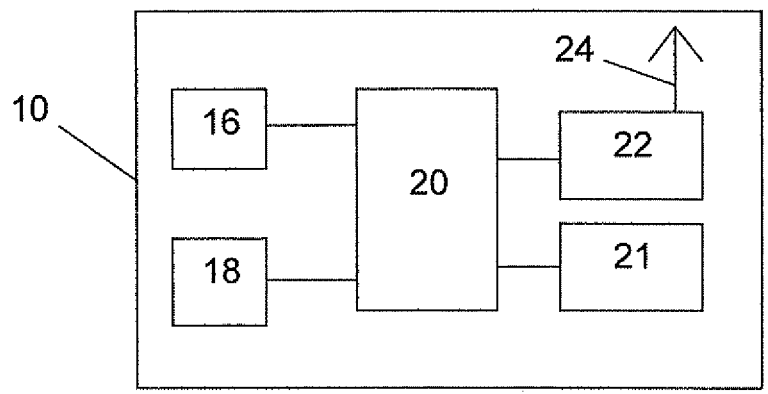
FIG. 3 shows a block schematic of different units within the portable communication device that are used in an implementation consistent with the invention, FIG. 4 schematically shows the displaying of an initial off-line page of a web browser on a display of the phone in FIG. 2.

FIG. 3 shows an exemplary block schematic of a portion of the phone from FIG. 2. The phone 10 includes the keypad 18 and display 16 that are both connected to a network browsing unit 20. The network browsing unit 20 provides a network browsing application. The network browsing unit 20 is in turn connected to a user area access store 21 and a radio communication unit 22, which communicates with the network via an antenna 24. The antenna 24 is here provided in the interior of the phone, i.e. it is built-in. Alternatively, the antenna 24 could be external to the phone 10. It should be appreciated that the phone normally comprises several more units and applications, which may be provided through one or more processors as well as memory units. Different applications of the device may furthermore be reached by using an Operative System. However, in order to simplify the description of the invention, the network browsing application provided by the network browsing unit 20 is here described as being the only application that is communicating directly with the radio communication unit 22.

Figure 4:
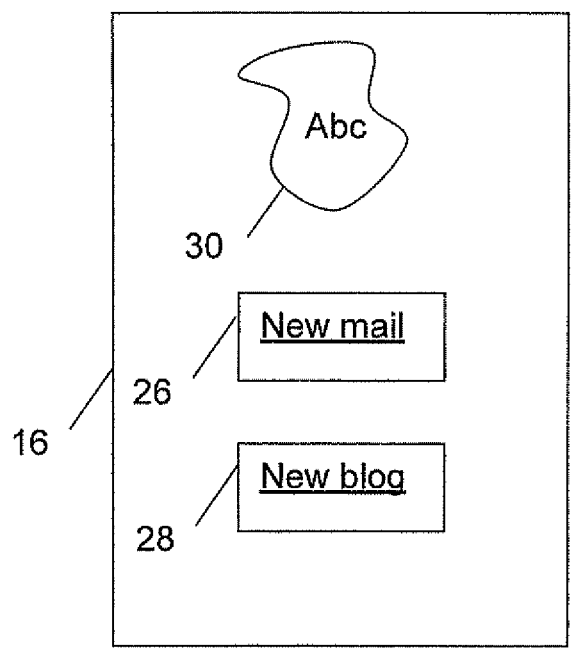

FIG. 4 shows an exemplary view provided on the display of the phone by the network browsing unit when the browsing function is first entered, that is here a so-called off-line page, provided by the phone itself. This is a view that in this embodiment shows a logotype 30 of the producer of the cellular phone. The page also shows a link 26 (New Mail) to a messaging service and a link 28 to a blog page (New blog) or home page that may be associated with a user of the phone.

The functioning of the invention will now be described with reference being made to FIG. 1-4 as well as to FIG. 5, which shows an exemplary flow chart of a method of enabling direct provision of a messaging handling area for a user of the phone. The method is carried out by the network browsing unit.

As a user of the phone first uses the network browsing application provided by the network browsing unit 20, the network browsing unit 20 presents the off-line page on the display 16 including the area 26, where a first link that is used for reaching the messaging service provider server 12 is provided. In this way, the browsing unit 20 provides the first link to the user, step 32.

The browsing unit 20 then awaits a selection of the link by the user, which selection may be performed, for example, using a navigation key on the keypad 18 or by the user selecting the display 16. If the link is not selected other functions of the browser may be selected instead. If, however, the first link is selected, step 34, an account setup function provided in the browser is invoked. In order to select the set up function, the set up function is associated with a user input unit, where the user input unit may be the actual area 26, if the display is a touch screen. It can also, as mentioned above, be a navigation key, soft key or any other key of the keypad 18 that is used singly or in combination with the area 26. It is furthermore possible to use also voice activation, when the user input unit may be a microphone. These are just a few examples of selecting the function, and several more exist. The unit that receives the selection is thus here termed user input unit. The function first asks the user if a new e-mail account is to be opened. If the user responds affirmative, the function is arranged to send a request from the browsing unit 20 to the messaging service provider and here to the server 12 to set up a mail account for the user, step 36, which is equivalent to requesting the messaging service provider to provide a message handling area for the user. The user may then handle messages in this area. The request may be sent in one or more data packets, for instance GPRS packets, and the server of the service provider may be identified using a pre-set location identifier, for instance a URL (Uniform Resource Locator). Thus, the browsing unit 20 orders the radio communication unit 22 to send this request to the server 12 via the antenna 24 and network 14. Here, the request also includes an identifier for the user for which an account is to be set up. The user is identified by an automatically generated user identifier that, in one embodiment of the invention, is a combination of an identifier of the phone, for instance an IMEI—(International Mobile Equipment Identity) code, and an identifier of the user, for instance an IMSI—(International Mobile Station Identity) code that is associated with the subscription to the use of the wireless network associated with the user. By using these two identifiers, which are easily accessible to the phone, it is possible to provide a unique user identifier. It is furthermore possible that the user identifier is a hash of these two identifiers. This user identifier may be generated before the browsing unit 20 is first used, during ordinary use of the browsing unit 20 or when the first link is selected.

After this request has been sent to the server 12, the server 12 processes the request and opens up an e-mail account and reserves a user area on the server 12 for the user, which area normally includes an e-mail inbox. The server 12 then generates login data, which login data includes a login name and perhaps some authentication data. The login data is to be used by the user when logging in to the account. This login data thus normally comprises a login name and a password to be used. The login data together with an identifier of a location on the server where the user area may be found and possibly also of the location of the server itself is then sent from the server 12 to the portable communication device 10 via the network 14, where it is received by the radio communication unit 22 via the antenna 24 and forwarded to the browsing unit 20, step 38. This identifier may also be provided in the form of a URL. As the browsing unit 20 receives this information it now creates a second link, step 40, which second link is used for directly accessing the user area, and replaces the first link with the second link on the off-line page, step 42, and then stores the login data, preferably together with the received location identifier and the earlier generated user identifier in the account access store 21, step 44, in order to be used when accessing the user area. The same user input unit is thus here associated with another function.

When the user then returns to the off-line page, the first link has been replaced with the second link. If the user now clicks on the same area 26 of the screen 16 where the first link was provided, the user instead selects the second link. If now the user selects the second link, step 44, a login function is invoked that automatically fetches the user identifier, login data and location identifier. Then it accesses the user area using all this data, step 48.

In this way, the user is directly logged onto his/her user area via a single click where desired messaging functions can be performed. The user does not have to perform complicated and burdensome settings, which greatly simplifies the set-up of the messaging service via the network.

This was just one embodiment of the invention. It should be realised that there exist several possible modifications. It is, for instance, possible that the service provider has several servers, where one server receives the request and another server keeps the user area. It is furthermore possible that the second link is not used for long after the replacing of links has been made. The user may, for instance, turn off the phone or shut down the browser application between the creation of the account and the accessing of the user area associated with the account. As a further alternative, the first link may not be replaced, but the second link is provided in addition to the first link. The second link may also be provided somewhere else or in addition to the off-line page, for instance, in a navigation bar of the browser, so that it may be accessible in other circumstances than via an off-line page. It is furthermore possible that only one or both location identifiers used for requesting the set up of a message handling area and accessing the message handling area are not stored in the portable communication device, but stored on an intermediate server, where further location identifiers pointing to these location identifiers on the intermediate server are provided in the portable communication device. This may be done in order to be able to allow changes of either the server where the user area is provided without the user having to do any change of settings or allow change of account altogether. It is furthermore possible that authentication may be omitted. If another user is using the portable communication device, it is normally necessary to set up a new account.

The network browsing unit according to an implementation consistent with the principles of the invention may be provided in the form of one or more processors with corresponding memory containing program code for performing the actions set out above. The account access store is normally a memory, like a RAM or ROM memory. The radio communication unit may include a separate hardware module, for instance, in the form of an ASIC circuit.

The server may likewise be implemented as a processor with corresponding memory comprising program code for performing the services and setting up of user areas, as well as provides memory space for such areas, for instance in the form of one or more hard discs, and may be provided with a suitable communication module for interfacing the network.

Figure 6:
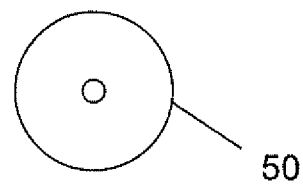
FIG. 6 shows a CD ROM disc on which program code for executing a method according to an implementation of the invention is provided.

The program code of the network browsing unit mentioned above can also be provided on one or more computer program products, such as a CD ROM disc 50 as depicted in FIG. 6, which may perform the functions of the invention when being loaded into a portable communication device having suitable processing capabilities. Naturally, other types of products can be provided for this, like, for instance, a removable memory, like a memory stick. The computer program product can also be provided as software, which is downloaded remotely from another server via the network.

The foregoing description of preferred embodiments of the invention provides illustration and description, but is not intended to be exhaustive or to limit the invention to the precise form disclosed. Modifications and variations are possible in light of the above teachings or may be acquired from practice of the invention.

Figure 5:
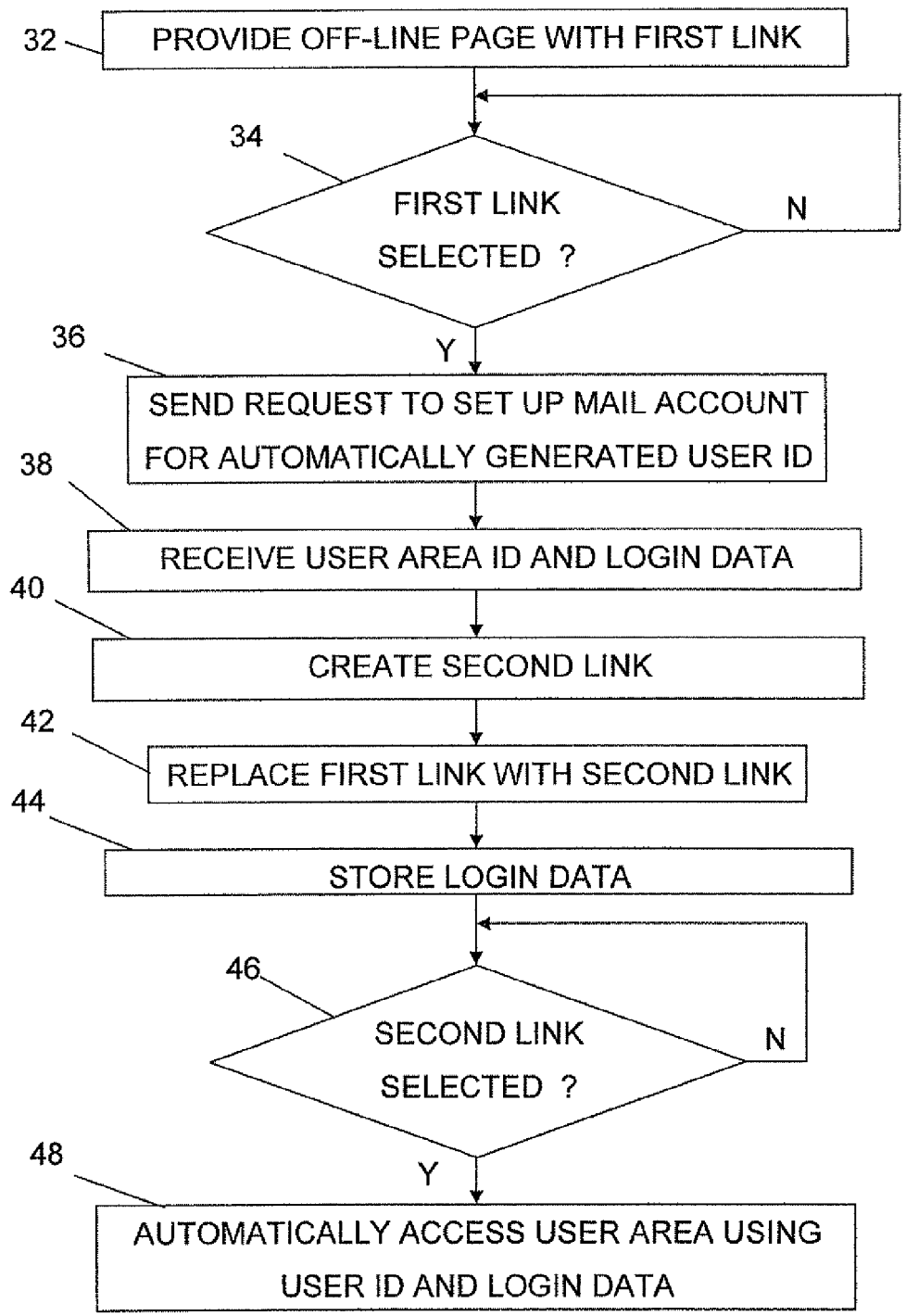
FIG. 5 shows a flow chart of a method of enabling direct provision of a message handling area at a server of a message service provider via a network browsing unit of the portable communication device.

For example, while a series of acts has been described with regard to FIG. 5, the order of the acts may be modified in other implementations consistent with the principles of the invention. Further, non-dependent acts may be performed in parallel.

It will be apparent to one of ordinary skill in the art that aspects of the invention, as described above, may be implemented in many different forms of software, firmware, and hardware in the implementations illustrated in the figures. The actual software code or specialized control hardware used to implement aspects consistent with the principles of the invention is not limiting of the invention. Thus, the operation and behavior of the aspects were described without reference to the specific software code—it being understood that one of ordinary skill in the art would be able to design software and control hardware to implement the aspects based on the description herein.

Further, certain portions of the invention may be implemented as "logic" that performs one or more functions. This logic may include hardware, such as an application specific integrated circuit or a field programmable gate array, software, or a combination of hardware and software.

It should be emphasized that the term "comprises/comprising" when used in this specification is taken to specify the presence of stated features, integers, steps, or components, but does not preclude the presence or addition of one or more other features, integers, steps, components, or groups thereof.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

The invention claimed is:

1. A method comprising:
    receiving, at a portable communication device, a first selection of a first user input unit,
    sending a request, from the portable communication device and in response to said first selection of said first user input unit, to a messaging service provider to set up a message handling area for a user,
    receiving, by the portable communication device, an identifier from the messaging service provider, where said identifier identifies the message handling area created for the user, in response to the request, and login data for logging into said message handling area,
    replacing, by the portable communication device and upon receiving the identifier, the first user input unit with a second user input unit that is associated with the created message handling area,
    receiving, by the portable communication device, a second selection of the second user input unit, that replaces the first user input unit and is associated with the created message handling area, and
    directly accessing, by the portable communication device, the message handling area in response to said second selection of the second user input unit without requiring the user to specify any of said login data.

2. The method according to claim 1, where said identifier that identifies a message handling area also identifies a server where the message handling area is provided.

3. The method according to claim 1 further comprising automatically storing the received login data at the portable communication device and automatically using said login data in response to the second selection of the second user input unit.

4. The method according to claim 1, where the sending of the request comprises sending an automatically generated user identifier.

5. The method according to claim 4, where directly accessing said message handling area, in response to said second selection of the second user input unit, comprises using the automatically generated user identifier.

6. The method according to claim 4, where the user identifier is based on an identifier of the portable communication device and an identifier associated with the user.

7. The method according to claim 6, where the user identifier is a hash of the identifier of the portable communication device of the identifier associated with the user.

8. The method according to claim 1, where said sending the request and said accessing are provided via a network browser application provided in the portable communication device.

9. The method according to claim 8, where said sending the request and said accessing are provided via a local information presentation page.

10. A portable communication device comprising:
    a network browsing unit to:
        receive a first selection of a first user input unit,
        send, in response to said first selection of said first user input unit, a request to a messaging service provider to set up a message handling area for a user,
        receive an identifier from the messaging service provider, where said identifier identifies the message handling area created for the user and login data for logging into said message handling area, replace, upon receiving said identifier, the first user input unit with a second user input unit that is associated with the created message handling area, receive a second selection of the second user input unit, and directly access the message handling area, by using the received identifier, in response to said second selection of the second user input unit, without requiring the user to specify any of said login data.

11. The portable communication device according to claim 10, where said identifier that identifies a message handling area also identifies a server where the message handling area is provided.

12. The portable communication device according to claim 10, where said network browsing unit is further to automatically store the received login data at the portable communication device and automatically use said login data in response to the second selection of the second user unit.

13. The portable communication device according to claim 10, where said request comprises an automatically generated user identifier.

14. The portable communication device according to claim 13, where said network browsing unit is to use the automatically generated user identifier to directly access said message handling area in response to said second selection of the second user input unit.

15. The portable communication device according to claim 13, where the user identifier is based on an identifier of the portable communication device and an identifier associated with the user.

16. The portable communication device according to claim 15, where the user identifier is a hash of the identifier of the portable communication device and the identifier associated with the user.

17. The portable communication device according to claim 10, where the network browsing unit is to provide a local information presentation page that allows at least one of said first and second selections.

18. The portable communication device according to claim 10, where the portable communication device includes a cellular phone.

19. A non-transitory computer program product comprising:

computer program code stored on the non-transitory computer program product to make a portable communication device perform a method when said program code is executed by the portable communication device, the method comprising:

receiving, at the portable communication device, a first selection of a first user input unit of the portable communication device, sending a request, from the portable communication device, in response to said first selection of said first user input unit, to a messaging service provider to set up a message handling area for a user, receiving, at the portable communication device, an identifier from the messaging service provider, where said identifier identifies the message handling area created for the user and login data for logging into said message handling area, replacing the first user input unit with a second user input unit, receiving, at the portable communication device, a second selection of the second user input unit, and directly accessing the message handling area in response to said second selection of the second user input unit of the portable communication device, without requiring the user to specify any of said login data.

20. The method according to claim 6, where the identifier of the portable communication device is an International Mobile Equipment Identity (IMEI) code, and where the identifier associated with the user is an International Mobile Station Identity (IMSI) code.

21. The method according to claim 7, where said hash is generated in response to the first selection of the first user input unit.

22. A method comprising:

providing, by a portable communication device, a first selectable item in a graphical user interface of the portable communication device that, upon selection, causes the portable communication device to send a request to a messaging service provider to set up a message handling area for a user and to provide an identifier to the portable communication device, where said identifier identifies the message handling area and login data for logging into the message handling area, and providing, by the portable communication device, a second selectable item in said graphical user interface that replaces the first selectable item in the graphical user interface upon selection of the first selectable item, where said second selectable item, upon selection, causes the portable communication device to directly access the message handling area for the user without requiring the user to specify any login data.

23. The method according to claim 22, where the first selectable item appears in the graphical user interface before selection of the first selectable item and does not appear in the graphical user interface after selection of the first selectable item, and where the second selectable item does not appear in the graphical user interface before selection of the first selectable item and appears in the graphical user interface after selection of the first selectable item.

* * * * *